United States Patent
Xu (10) Patent No.: US 12,487,701 B1
(45) Date of Patent: Dec. 2, 2025

(54) DRIVING METHOD FOR TOUCH PANEL, DRIVING DEVICE FOR TOUCH PANEL, AND DISPLAY DEVICE

(71) Applicant: Guangzhou China Star Optoelectronics Semiconductor Display Technology Co., LTd., Guangdong (CN)

(72) Inventor: Min Xu, Guangdong (CN)

(73) Assignee: Guangzhou China Star Optoelectronics Semiconductor Display Technology Co., Ltd., Guangdong (CN)

( * ) Notice: Subject to any disclaimer, the term of this patent is extended or adjusted under 35 U.S.C. 154(b) by 0 days.

(21) Appl. No.: 18/964,412

(22) Filed: Nov. 30, 2024

(30) Foreign Application Priority Data

Aug. 22, 2024 (CN) .......................... 202411162156.X (51) Int. Cl.
    *G06F 3/041* (2006.01)

(52) U.S. Cl.
    CPC ........ *G06F 3/04166* (2019.05); *G06F 3/0412* (2013.01)

(58) Field of Classification Search
    CPC .......................... G06F 3/04166; G06F 3/0412
    See application file for complete search history.

(56) References Cited

U.S. PATENT DOCUMENTS

2014/0347297 A1\* 11/2014 Tsuji .................... G06F 3/0412
                                                         345/173

\* cited by examiner

*Primary Examiner* — Yaron Cohen
(74) *Attorney, Agent, or Firm* — PV IP PC; Peter S. Stecher; Wei Te Chung (57) ABSTRACT

The disclosure provides a driving method for a touch panel, a driving device, and a display device. The method includes: controlling the touch panel to scan and display a first image frame according to a first timing sequence including first display stages and first touch stages alternately performed in time-sharing, in which a first switching position is defined between each of the first display stages and each of the first touch stages; determining a second timing sequence according to the first timing sequence, in which the second timing sequence includes second display stages and second touch stages alternately performed in time-sharing, and a second switching position different from the first switching position is defined between each of the second display stages and each of the second touch stages; controlling the touch panel to scan and display a second image frame according to the second timing sequence.

11 Claims, 6 Drawing Sheets

FIG. 8 and display at least one first image frame according to a first timing sequence, in which the first timing sequence includes a plurality of first display stages and a plurality of first touch stages alternately performed in time-sharing, the touch panel is configured to scan and display the first image frame in the first display stages and load touch signals in the first touch stages, and a first switching position is defined between each of the first display stages and each of the first touch stages; and

DRIVING METHOD FOR TOUCH PANEL, DRIVING DEVICE FOR TOUCH PANEL, AND DISPLAY DEVICE

CROSS-REFERENCE TO RELATED APPLICATION

The disclosure claims the priority to and benefit of Chinese Patent Application No. 202411162156.X, filed on Aug. 22, 2024, the disclosure of which is incorporated herein by reference in its entirety.

TECHNICAL FIELD

The disclosure relates to the field of battery, and in particular, to a driving method for a touch panel, a driving device for a touch panel, and a display device.

BACKGROUND

In-cell touch panels have been widely used in electronic devices due to their advantages of adapting the combination of display driving technology and touch technology, which can better meet the requirements for a high refresh rate of display and a high reporting rate of touch. The in-cell touch panels are mainly driven in a horizontal synchronous scanning mode (hereafter referred to as "Long H mode"), which refers to the insertion of touch stages at intervals in time-sharing during the display processes, that is, the display stages and the touch stages are alternately performed in time-sharing in each image frame. However, due to the brightness difference when switching between the touch stages and the display stages, horizontal stripes are prone to occur when the touch panels display the screen, affecting the user experience for the touch panels.

SUMMARY

In a first aspect, some embodiments of the disclosure provide a driving method for a touch panel, including:

controlling the touch panel to scan and display at least one first image frame according to a first timing sequence, in which the first timing sequence includes a plurality of first display stages and a plurality of first touch stages alternately performed in time-sharing, the touch panel is configured to scan and display the first image frame in the first display stages and load touch signals in the first touch stages, and a first switching position is defined between each of the first display stages and each of the first touch stages;

determining a second timing sequence according to the first timing sequence, in which the second timing sequence includes a plurality of second display stages and a plurality of second touch stages alternately performed in time-sharing, a second switching position is defined between each of the second display stages and each of the second touch stages, and the second switching position is different from the first switching position; and controlling the touch panel to scan and display at least one second image frame according to the second timing sequence, in which the second image frame is located after the first image frame, and the touch panel is further configured to scan and display the second image frame in the second display stages and load touch signals in the second touch stages.

In a second aspect, some embodiments of the disclosure provide a driving device for a touch panel, including:

a control module configured to control the touch panel to scan and display at least one first image frame according to a first timing sequence, in which the first timing sequence includes a plurality of first display stages and a plurality of first touch stages alternately performed in time-sharing, the touch panel is configured to scan and display the first image frame in the first display stages and load touch signals in the first touch stages, and a first switching position is defined between each of the first display stages and each of the first touch stages; and a processing module configured to determine a second timing sequence according to the first timing sequence, in which the second timing sequence includes a plurality of second display stages and a plurality of second touch stages alternately performed in time-sharing, a second switching position is defined between each of the second display stages and each of the second touch stages, and the second switching position is different from the first switching position;

in which the control module is further configured to control the touch panel to scan and display at least one second image frame according to the second timing sequence, the second image frame is located after the first image frame, and the touch panel is further configured to scan and display the second image frame in the second display stages and load touch signals in the second touch stages.

In a third aspect, some embodiments of the disclosure further provide a display device including a touch panel and a timing controller;

in which the timing controller includes the driving device for the touch panel as described above, or, the timing controller adopts the driving method for the touch panel as described above to control display and touch of the touch panel.

BRIEF DESCRIPTION OF THE DRAWINGS

In order to explain technical solutions in embodiments of the disclosure more clearly, the following will briefly introduce the drawings needed to be used in description of the embodiments. Apparently, the drawings in the following description are only some embodiments of the disclosure. For ordinary skilled in the art, other drawings can be obtained from these drawings without paying creative effort.

REFERENCE CHARACTERS

10, touch panel; 20, timing controller; 21, driving device; 211, control module; and 212, processing module.

DETAILED DESCRIPTION

The following will provide a clear and complete description of technical solutions in embodiments of the disclosure in conjunction with the drawings. Apparently, the following embodiments are only a part of the embodiments of the disclosure, not all of them. According to the embodiments of the disclosure, all some embodiments obtained by those skilled in the art without creative labor are within the scope of protection of the disclosure.

In the description of the disclosure, it should be understood that directional or positional relationships indicated by the terms "on", "above", "below", "front", "back", "left", "right", "top", "bottom", "inside", "outside", and the like, are according to the directional or positional relationships shown in the drawings, which are used only for the convenience of describing the disclosure and simplifying the description, rather than indicating or implying that the devices or elements must have a specific direction, be constructed or operated in a specific direction. Therefore, the terms cannot be interpreted as a limitation on the disclosure. In addition, the terms "first" and "second" are used only for the purpose of description cannot be understood as indicating or implying relative importance or implying the number of technical features indicated. Therefore, the features limited to "first" and "second" may explicitly or implicitly include one or more features. In the description of the disclosure, the term "a plurality of" indicates two or more than two, and the term "at least one" refers to one, two, or more than two, unless otherwise specified.

Figure 1:
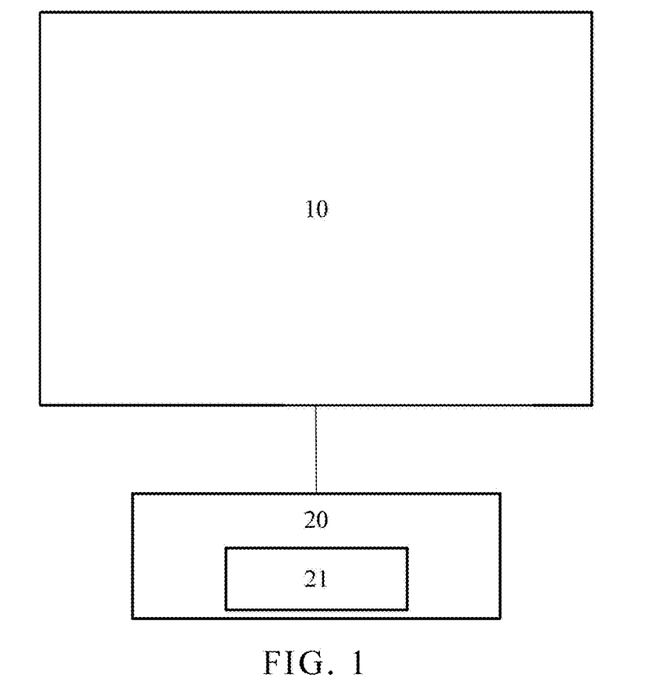
FIG. 1 is a schematic structural diagram of a display device provided in some embodiments of the disclosure.

As illustrated in FIG. 1, FIG. 1 is a schematic structural diagram of a display device provided in some embodiments of the disclosure. Some embodiments of the disclosure provide a display device including a touch panel 10, a timing controller 20, a source driver, and a gate driver. The timing controller 20 is connected to the source driver and the gate driver, and the timing controller 20 may include a driving device 21 configured to provide driving signals to the source driver and the gate driver. The source driver and the gate driver are connected to the touch panel 10, the gate driver is configured to generate scanning signals according to received driving signals, the source driver is configured to generate grayscale voltages according to received driving signals, and the source driver and the gate driver drive the touch panel 10 together for display and touch.

Specifically, the touch panel 10 may be an in-cell touch panel. The touch panel 10 includes a plurality of scanning lines, a plurality of data lines, and a plurality of pixel units arranged in an array. The scanning lines are configured to strobe corresponding rows of pixel units according to scanning signals, and the data lines are configured to transmit corresponding grayscale voltages.

Figure 2:
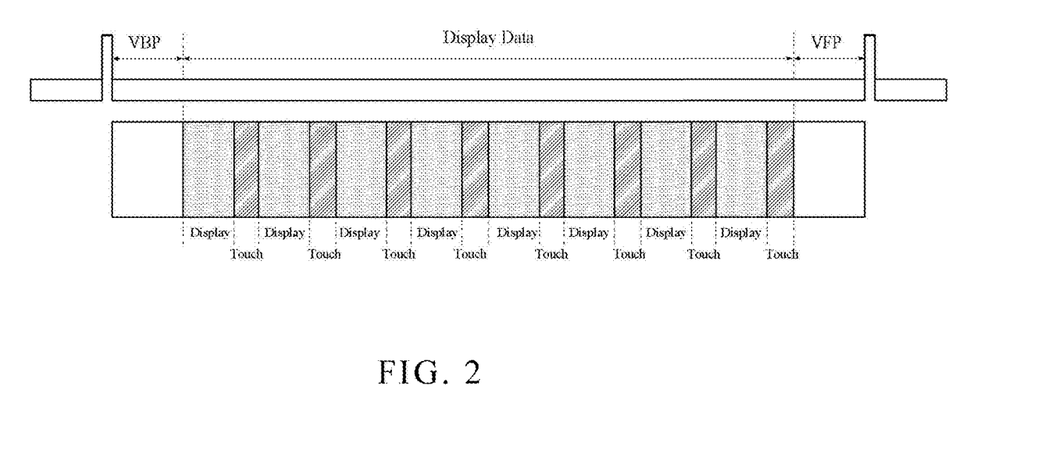
FIG. 2 is a schematic diagram of a scanning timing sequence of a touch panel in a horizontal synchronous scanning mode provided in some embodiments of the disclosure.
Figure 3:
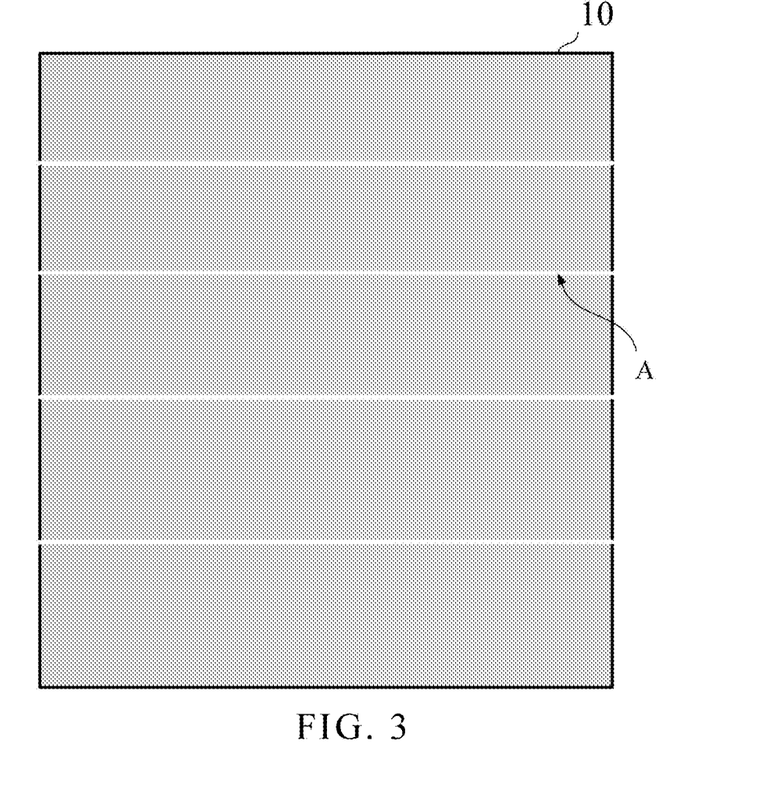
FIG. 3 is a schematic diagram of a display effect of the touch panel provided in some embodiments of the disclosure.

Referring to FIG. 2 and FIG. 3, FIG. 2 is a schematic diagram of a scanning timing sequence of a touch panel in a horizontal synchronous scanning mode (hereafter referred to as "Long H mode") provided in some embodiments of the disclosure, and FIG. 3 is a schematic diagram of a display effect of the touch panel provided in some embodiments of the disclosure. The touch panel 10 is mainly driven in the Long H mode, so as to meet the requirements for a high refresh rate of display and a high reporting rate of touch. A duration of each image frame of the touch panel 10 may include a duration of a vertical back porch (VBP), a duration of a vertical front porch (VFP), and a total duration of data scanning (Display Data). A scanning cycle of the touch panel 10 includes a plurality of display stages (Display) and a plurality of touch stages (Touch) alternately performed in time-sharing in the Long H mode, that is, a plurality of touch stages (Touch) are inserted in the display processes of the data scanning (Display Data) at intervals in time-sharing. The display stages (Display) are configured to scan and display image frames, and the touch stages (Touch) are configured to load touch signals. Specifically, after the scanning of a certain number of rows in one of the display stages (Display) is completed, the touch scanning in one of the touch stages (Touch) is performed, and then the scanning of a certain number of rows in another one of the display stages (Display) is performed, repeat these processes alternately.

The number of the display stages (Display) may be M, and M display stages (Display) are performed at intervals in time-sharing; the number of the touch stages (Touch) may be N, and N touch stages (Touch) are performed at intervals in time-sharing; each of the N touch stages (Touch) and adjacent two of the M display stages (Display) are performed sequentially in time-sharing; and M and N are both positive integers. Therefore, the total duration of the data scanning (Display Data) includes a total duration of the M display stages (Display) and a total duration of the N touch stages (Touch). In some embodiments, M is equal to N in the Long H mode. Alternatively, an absolute value of a difference between M and N is equal to 1 in the Long H mode.

In the embodiments of the disclosure, a duration of one of the display stages (Display) refers to the product of the number of rows scanned in one of the display stages (Display) and a duration of scanning each row. Therefore, for the convenience of description, the duration of each of the display stages (Display) can be represented by the number of rows scanned. Accordingly, a duration of each of the touch stages (Touch) can be represented by the multiple of durations of scanning the rows.

For example, the duration of each of the display stages (Display) is equal to a duration of scanning four rows, after the scanning of every four rows is completed, one of the touch stages (Touch) is inserted and performed. That is, the duration of each of the display stages (Display) is equal to the scanning duration of every four scanning lines. Specifically, in one of the display stages (Display), the gate driver sequentially scans four rows through four scanning lines (Gate 1 to Gate 4), and the gate driver sequentially strobes corresponding four rows of pixel units; and the source driver transmits corresponding grayscale voltages through data lines. After the scanning of the scanning line Gate 4 is completed, the touch scanning of one of the touch stages (Touch) is performed to achieve touch detection, and the scanning of the scanning lines (Gate 1 to Gate 4) stops at this time. After the touch scanning of one of the touch stages (Touch) is completed, a next one of the display stages (Display) is performed, the gate driver sequentially scans another four rows through four scanning lines (Gate 5 to Gate 8), and the gate driver sequentially strobes corresponding four rows of pixel units; and the data lines transmit corresponding grayscale voltages. After the scanning of the scanning line Gate 8 is completed, the touch scanning of a next one of the touch stages (Touch) is performed, and the scanning of the scanning lines (Gate 5 to Gate 8) stops at this time. The above processes are alternately performed in time-sharing until the display of one image frame is completed.

However, in the above scanning processes, the normal display processes are interrupted by the touch scanning. When entering and exiting the touch stages (Touch), switches connected to the scanning lines may be turned off and turned on, which is easy to couple with a common voltage VCOM, resulting in a change in the voltage difference between the grayscale voltage on the data lines and the common voltage VCOM. This leads to a brightness difference when switching between the touch stages (Touch) and the display stages (Display), even worse, horizontal stripes (also known as "TP pit patterns A") caused by the brightness difference will appear on the display screen. Especially, for low to medium grayscales of pure color images, such as 64 grayscales, 128 grayscales, and the like, the regular equidistant horizontal stripes may be more obvious, which will affect the subjective visual taste. Moreover, since switching positions between the touch stages (Touch) and the display stages (Display) of different image frames are the same, it will further form a superposition effect on the horizontal stripes spatially, enabling the users to perceive the horizontal stripes more clearly. Even by adjusting the duty cycle of clock signals, the horizontal stripes cannot be completely improved, affecting the user experience for products.

To solve the above problem(s), the embodiments of the disclosure provide a driving method for a touch panel, in which the switching positions between the display stages and the touch stages of different image frames are different. Therefore, by utilizing the exchange of time and space to disrupt the occurrence position of horizontal stripes, the embodiments of the disclosure can reduce the identifiability of the human eye to the horizontal stripes, so as to improve the user experience for the touch panel.

Figure 4:
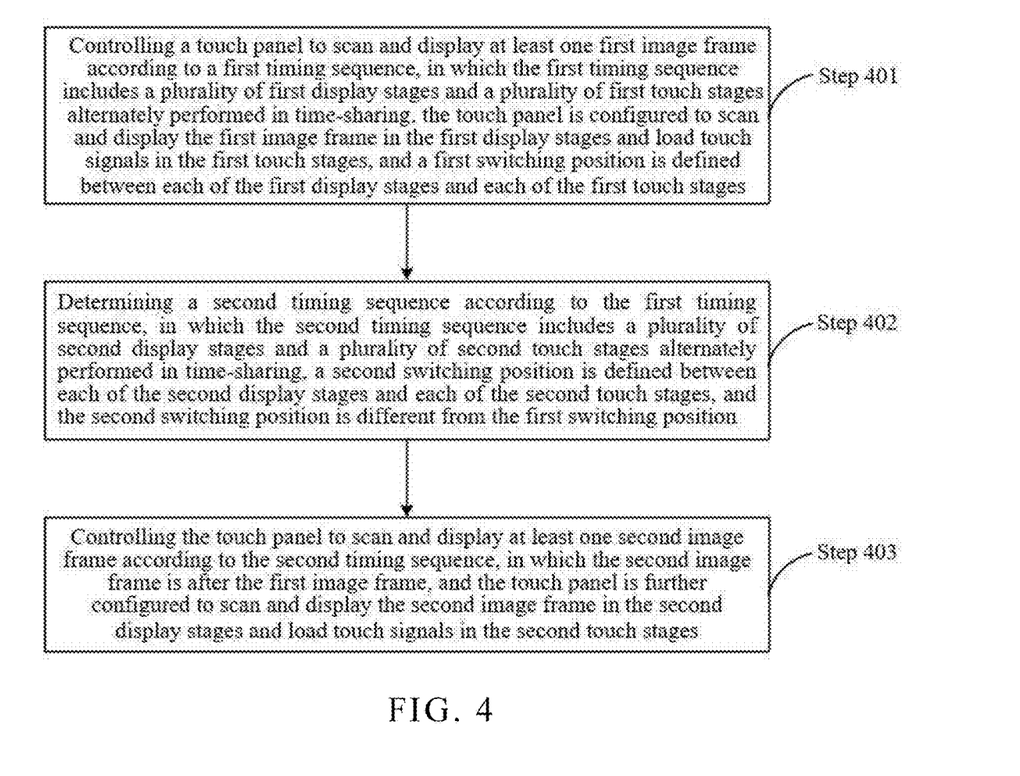
FIG. 4 is a flowchart of a driving method for a touch panel provided in some embodiments of the disclosure.

As illustrated in FIG. 4, FIG. 4 is a flowchart of the driving method for the touch panel provided in some embodiments of the disclosure. The driving method for the touch panel can be applied to the timing controller 20. Specifically, the driving method includes the following step 401, step 402, and step 403.

Step 401, controlling the touch panel to scan and display at least one first image frame according to a first timing sequence, in which the first timing sequence includes a plurality of first display stages and a plurality of first touch stages alternately performed in time-sharing, the touch panel is configured to scan and display the first image frame in the first display stages and load touch signals in the first touch stages, and a first switching position is defined between each of the first display stages and each of the first touch stages.

Specifically, the first image frame can be any image frame in the video stream. During the display process of the first image frame, the first display stages and the first touch stage are alternately performed in time-sharing. The first switching position can be represented by the position of the row scanned when switching between each of the first display stages and each of the first touch stages.

Figure 5:
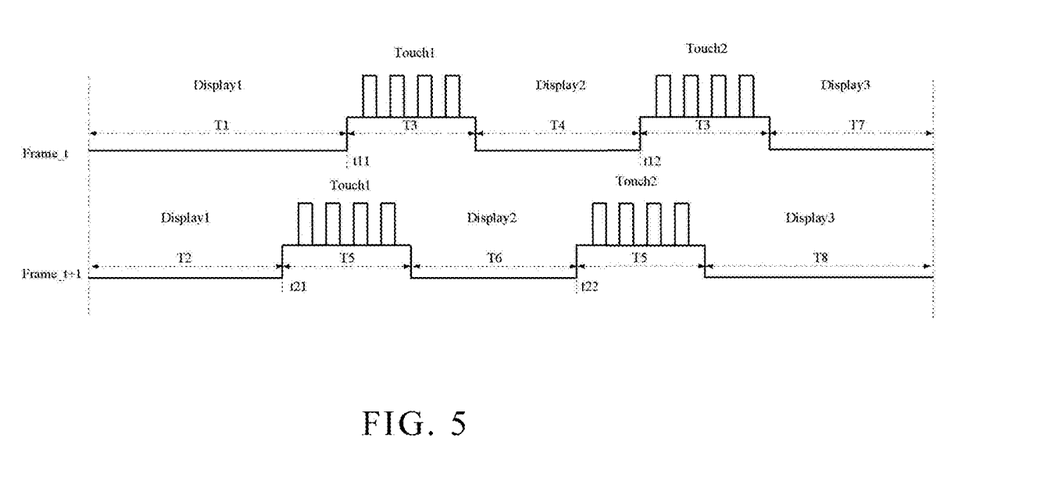
FIG. 5 is a schematic diagram of a first timing sequence and a second timing sequence provided in some embodiments of the disclosure.

As illustrated in FIG. 5, FIG. 5 is a schematic diagram of the first timing sequence and a second timing sequence provided in some embodiments of the disclosure. In some embodiments, taking the first image frame as a tth image frame (Frame_t) as an example. In the first timing sequence, a first one of the M first display stages (Display 1) has a first duration T1, each of the N first touch stages has a third duration T3, and one of the first display stages between any adjacent two of the first touch stages has a fourth duration T4. In addition, a last one of the M first display stages has a seventh duration T7. In the embodiments of the disclosure, the first duration T1, the fourth duration T4, and the seventh duration T7 can be equal or not equal.

For example, M is equal to 3, N is equal to 2, the number of total scanning rows of the touch panel is 240, the number of scanning rows of the touch panel in each of three first display stages is 80, and the first duration T1, the fourth duration T4, and the seventh duration T7 are equal. Specifically, the number of scanning rows of the touch panel in the first one of the first display stages (Display 1) is 80 in the first duration T1, when switching to a first one of the first touch stages (Touch 1) for touch scanning, the first switching position t11 is at the 80th row. After the first one of the first touch stages (Touch 1) is completed, switching to a second one of the first display stages (Display 2), although the first one of the first touch stages (Touch 1) has a third duration T3, the number of total scanning rows of the touch panel remains unchanged and is 80 in the first one of the first touch stages (Touch 1). Continuing the display in the second one of the first display stages (Display 2), the number of scanning rows of the touch panel in the second one of the first display stages (Display 2) is 80 in the fourth duration T4, when switching to a second one of the first touch stages (Touch 2) for touch scanning, the first switching position t12 is at the 160th row. After the second one of the first touch stages (Touch 2) is completed, switching to a third one of the first display stages (Display 3), although the second one of the first touch stages (Touch 2) has a third duration T3, the number of total scanning rows of the touch panel remains unchanged and is 160 in the second one of the first touch stages (Touch 2). Continuing the display in a third one of the first display stages (Display 3), and the number of scanning rows of the touch panel in the third one of the first display stages (Display 3) is 80 in the seventh duration T7. After the third one of the first display stages (Display 3) is completed, the scanning and display of the 240th row is completed.

Step 402, determining a second timing sequence according to the first timing sequence, in which the second timing sequence includes a plurality of second display stages and a plurality of second touch stages alternately performed in time-sharing, a second switching position is defined between each of the second display stages and each of the second touch stages, and the second switching position is different from the first switching position.

Specifically, the second switching position can be represented by the position of the row scanned when switching between each of the second display stages and each of the second touch stages.

In the embodiments of the disclosure, both of the first display stages and the second display stages represent display stages for scanning and displaying image frames, and both of the first touch stages and the second touch stages represent touch stages for loading touch signals, but the timing sequences of the first display stages and the second display stages are different, and the timing sequences of the first touch stages and the second touch stage are different, so the terms "first" and "second" are distinguished only for the convenience of description.

As illustrated in FIG. 5, in some embodiments, taking the second image frame as a (t+1)th image frame (Frame_t+1) as an example. In the second timing sequence, a first one of the M second display stages (Display 1) has a second duration T2, each of the N second touch stages has a fifth duration T5, and one of the second display stages between any adjacent two of the second touch stages has a sixth duration T6. In addition, a last one of the M second display stages has an eighth duration T8. In the embodiments of the disclosure, the second duration T2, the sixth duration T6, and the eighth duration T8 can be equal or not equal.

In some embodiments, the third duration T3 is equal to the fifth duration T5, the fourth duration T4 is equal to the sixth duration T6, and the second duration T2 is not equal to the first duration T1.

That is, in the above embodiments, the number of the first touch stages is equal to the number of the second touch stages, a total duration of the first touch stages is equal to a total duration of the second touch stages, and the duration of each of the first touch stages is equal to the duration of each of the second touch stages; and the duration of one of the first display stages between any adjacent two of the first touch stages is equal to the duration of one of the second display stages between any adjacent two of the second touch stages. The difference between the second timing sequence and the first timing sequence is in that the duration of the first one of the first display stages is not equal to the duration of the first one of the second display stages.

It can be understood that in some embodiments of the disclosure, the total duration of each image frame is unchanged, the total duration of the data scanning of each image frame is unchanged, the number and durations of the first touch stages of the first image frame are respectively equal to the number and durations of the second touch stages of the second image frame. Therefore, when the duration of the first one of the first display stages is not equal to the duration of the first one of the second display stages, the duration of the last one of the first display stages is not equal to the duration of the last one of the second display stages. That is, the seventh duration T7 may be not equal to the eighth display duration T8, which can be adaptively adjusted according to the actual needs.

As illustrated in FIG. 5, for the (t+1)th image frame (Frame_t+1), in some embodiments, M is equal to 3, N is equal to 2, the number of total scanning rows of the touch panel is 240, the number of scanning rows of the touch panel in the first one of the second display stages (Display 1) is 5, the number of scanning rows of the touch panel in a second one of the second display stages (Display 2) is 80, and the number of scanning rows of the touch panel in a third one of the second display stages (Display 3) is 155. Specifically, the number of scanning rows of the touch panel in the first one of the second display stages (Display 1) is 5 in the second duration T2, when switching to the first one of the second touch stages (Touch 1) for touch scanning, the second switching position t21 is at the 5th row. After the first one of the second touch stages (Touch 1) is completed, switching to a second one of the second display stages (Display 2). Since the number of scanning rows of the touch panel in the second one of the second display stages (Display 2) is 80 in the sixth duration T6, when switching to a second one of the second touch stages (Touch 2) for touch scanning, the second switching position t22 is at the 85th row. After the second one of the second touch stages (Touch 2) is completed, switching to a third one of the second display stages (Display 3). The number of scanning rows of the touch panel in the third one of the second display stages (Display 3) is 155 in the eighth duration T8. After the third one of the second display stages (Display 3) is completed, the scanning and display of the 240th row is completed.

In the above embodiments, by setting the durations of the first ones of the first display stages of different image frames being not equal, it can be achieved that the switching positions between the display stages and the touch stages of different image frames are different, so as to facilitate the adjustment of timing sequences, improve processing speed, and avoid the situation where the display stages and the touch stages of different image frames switch at the same position, which may aggravate the horizontal stripes at the same position. Therefore, by utilizing the exchange of time and space to disrupt the occurrence position of the horizontal stripes, the embodiments of the disclosure can reduce the identifiability of the human eye to the horizontal stripes, so as to improve the user experience for the touch panel.

In some embodiments, the step of determining the second duration includes the following step:
  determining the second duration according to a preset adjustment value and the first duration.

In the disclosure, the preset adjustment value can be a positive value or a negative value, which is not limited herein.

In some embodiments, the step of determining the second duration according to a preset adjustment value and the first duration includes the following step: determining a sum of the preset adjustment value and the first duration. Specifically, the step the following steps: determining the sum of the first duration and the preset adjustment value as the second duration in response to the sum of the first duration and the preset adjustment value being in a preset duration range; or, determining an absolute value of a difference between the first duration and the preset adjustment value as the second duration in response to the sum of the first duration and the preset adjustment value exceeding the preset duration range.

In the above embodiments, the first duration can be adjusted according to the preset adjustment value, simplifying the complexity of adjustment of timing sequences and avoiding the switching positions at the same location, so that the identifiability of the human eye to the horizontal stripes can be reduced by utilizing the exchange of time and space, which further improves the user experience for the touch panel.

In some embodiments, the step of determining the second duration includes the following steps:
  generating a random duration in a preset duration range;
  determining the random duration as the second duration in response to the random duration being not equal to the first duration; or
  regenerating the random duration in the preset duration range in response to the random duration being equal to the first duration.

Specifically, a random number can be generated in a preset duration range through a pre-set algorithm to obtain the random duration. The embodiments of the disclosure do not limit the specific algorithm for generating the random number.

In the above embodiments, the changes of the switching positions between the display stages and the touch stages of different image frames have a high degree of dispersion, which further disrupts the occurrence position of horizontal stripes spatially, making it more difficult for the human eye to identify the horizontal stripes, and significantly improving the display effect of the touch panel.

In some embodiments, the adjustment of timing sequences can also be achieved by changing the duration of any other display stage, and the embodiments of the disclosure do not limit on this.

In some embodiments, the step 402 includes the following steps:
  determining a starting position and an end position of the first one of the second display stages according to a starting position of the first one of the first display stages and the second duration; and determining a starting position and an end position of each of remaining ones of the second display stages, and determining a starting position and an end position of each of the second touch stages, according to the end position of the first one of the second display stages, the fifth duration, the sixth duration, and a total duration of data scanning of each image frame.

Specifically, determining the starting position of the first one of the first display stages as the starting position of the first one of the second display stages, in which the duration of the first one of the second display stages is the second duration; determining the end position of the first one of the second display stages as a starting position of the first one of the second touch stages, in which the duration of the first one of the second touch stages is the fifth duration; determining an end position of the first one of the second touch stages as a starting position of the second one of the second display stages, in which the duration of the second one of the second display stages is the sixth duration; determining an end position of the second one of the second display stage as a starting position of the second one of the second touch stages, in which the duration of the second one of the second touch stages is the fifth duration; and determining an end position of the second one of the second touch stages as a starting position of the third one of the second display stages, in which the duration of the third one of the second display stages is the eighth duration, et cetera, until the second timing sequence is determined.

Step 403, controlling the touch panel to scan and display at least one second image frame according to the second timing sequence, in which the second image frame is located after the first image frame, and the touch panel is further configured to scan and display the second image frame in the second display stages and load touch signals in the second touch stages.

Specifically, the second image frame can be any image frame located after the first image frame in the video stream. During the display process of the second image frame, the second display stages and the second touch stages are alternately performed in time-sharing.

In some embodiments, the at least one first image frame includes consecutive K first image frames, the at least one second image frame includes consecutive T second image frames, and the timing sequence of the first one of the consecutive T second image frames is adjacent to the timing sequence of the last one of the consecutive K first image frames, in which K and T are both positive integers. The embodiments of the disclosure do not limit on the values of K and T.

In some embodiments, one first image frame is driven according to the first timing sequence, and then one second image frame is driven according to the second timing sequence. Alternatively, a plurality of consecutive first image frames are driven according to the first timing sequence, and then one second image frame is driven according to the second timing sequence. Alternatively, a plurality of consecutive first image frames are driven according to the first timing sequence, and then a plurality of consecutive second image frames are driven according to the second timing sequence. Alternatively, one first image frame is driven according to the first timing sequence, and then a plurality of consecutive second image frames are driven according to the second timing sequence.

In some embodiments, after the step 403, the driving method for the touch panel may further include the following steps:

determining a third timing sequence according to the second timing sequence, in which the third timing sequence includes a plurality of third display stages and a plurality of third touch stages alternately performed in time-sharing, a third switching position is defined between each of the third display stages and each of the third touch stages, and the third switching position is different from the second switching position; and controlling the touch panel to scan and display at least one third image frame according to the third timing sequence, in which the third image frame is located after consecutive T second image frames and adjacent to a last one of the consecutive T second image frames; and the touch panel is further configured to scan and display the third image frame in the third display stages and load touch signals in the third touch stages.

Figure 7:
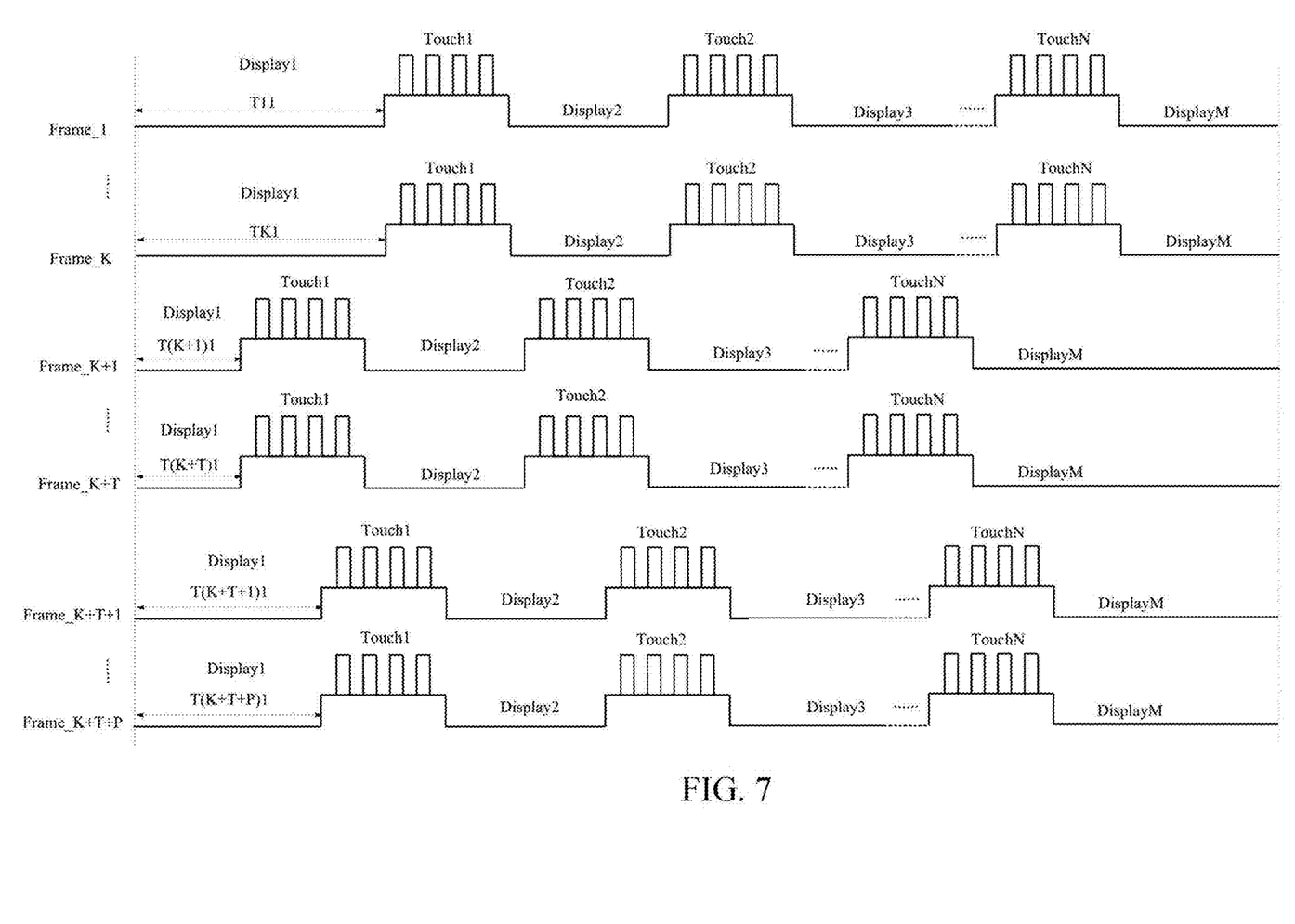
FIG. 7 is another schematic diagram of the driving timing sequence of the plurality of consecutive image frames provided in some embodiments of the disclosure.

Specifically, the third image frame is an image frame in the video stream that is located after the consecutive T second image frames and adjacent to the last one of the consecutive T second image frames. During the display process of the third image frame, the third display stages and the third touch stages are alternately performed in time-sharing. The number of third image frame may be one or more. For example, when the number of the third image frames is plural, for example, the number of the third image frames is P, in which P is a positive integer. As illustrated in FIG. 7, in some embodiments, the touch panel 10 includes consecutive K first image frames, consecutive T second image frames, and consecutive P third image frames. The consecutive K first image frames are from a first image frame to a Kth image frame, the consecutive T second image frames are from a (K+1)th image frame to a (K+T)th image frame, and the consecutive P third image frames are from the (K+T+1)th image frame to the (K+T+P)th image frame.

It should be noted that the method of determining the third timing sequence according to the second timing sequence can refer to the method of determining the second timing sequence according to the first timing sequence described in the previous embodiments, and the method of determining starting positions and end positions of each of the third display stages and each of the third touch stages in the third timing sequence can refer to the method of determining starting positions and end positions of each of the second display stages and each of the second touch stages in the second timing sequence described in the previous embodiments, which will not be repeated here. In addition, the method of determining the third timing sequence according to the second timing sequence can also be different from the method of determining the second timing sequence according to the first timing sequence, which is not limited herein.

In some embodiments of the disclosure, for a plurality of image frames in the video stream, a first one of the image frames is driven according to the first timing sequence or a consecutive plurality of image frames are driven according to the first timing sequence, then a second one of the image frames is driven according to the second timing sequence or a consecutive plurality of image frames are driven according to the second timing sequence, and then a third one of the image frames is driven according to the third timing sequence or a consecutive plurality of image frames are driven according to the third timing sequence, et cetera, so as to avoid the switching positions between the display stages and the touch stages in the entire video stream being at the same position of the touch panel, which may aggravate the identifiability of the human eye to the horizontal stripes. Moreover, by continuously switching the switching positions between the display stages and the touch stages, and utilizing the exchange of time and space to disrupt the occurrence position of the horizontal stripes, the embodiments of the disclosure can reduce the identifiability of the human eye to the horizontal stripes, so as to improve the user experience for the touch panel.

It can be understood that, for a plurality of consecutive image frames in the video stream, the driving method provided in the embodiments can generate a timing sequence of a second one of the consecutive image frames while displaying a first one of the consecutive image frames, generate a timing sequence of a third one of the consecutive image frames while displaying the second one of the consecutive image frames, . . . , generate a timing sequence of a (i+1)th one of the consecutive image frames while displaying a ith one of the consecutive image frames, et cetera, until the display of the entire video stream is completed.

In order to more intuitively illustrate the driving timing sequence provided in the embodiments of the disclosure, the driving timing sequence of a plurality of consecutive image frames will be described below in conjunction with the drawings.

Figure 6:
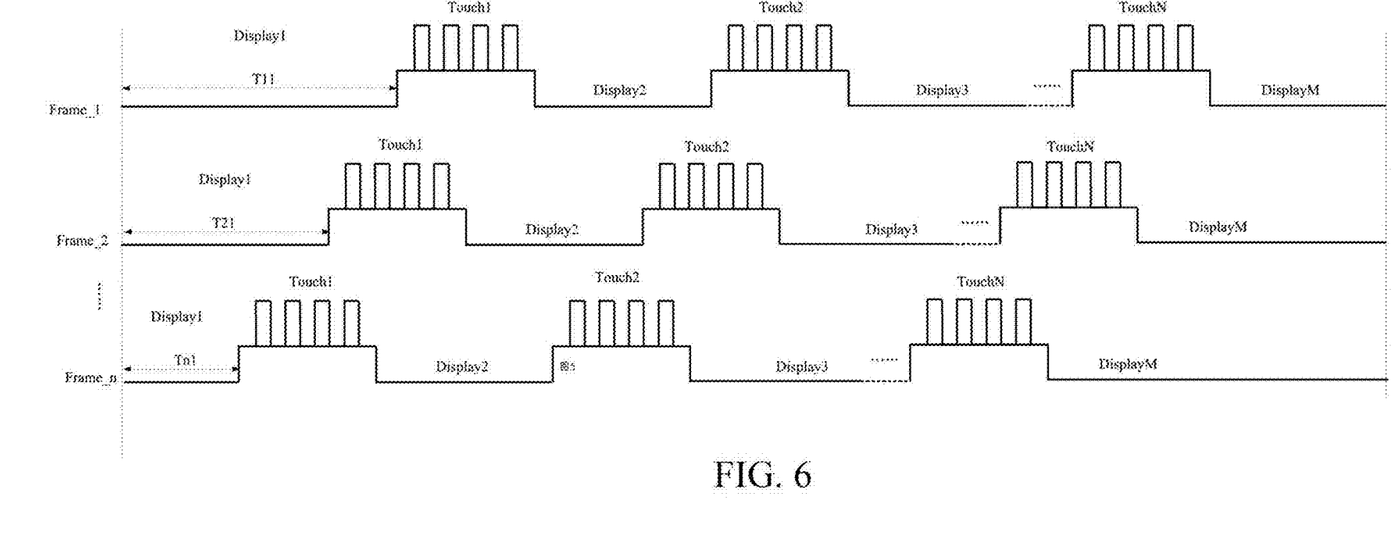
FIG. 6 is a schematic diagram of a driving timing sequence of a plurality of consecutive image frames provided in some embodiments of the disclosure.

As illustrated in FIG. 6, FIG. 6 is a schematic diagram of a driving timing sequence of a plurality of consecutive image frames provided in some embodiments of the disclosure. For a plurality of consecutive image frames (Frame_1 to Frame_n), the display process of each image frame includes a plurality of display stages and a plurality of touch stages alternately performed in time-sharing, for example, a first display stage (Display 1), a first touch stage (Touch 1), a second display stage (Display 2), a second touch stage (Touch 2), . . . , a Nth touch stage (Touch N), and a Mth display stage (Display M) alternatively performed in time-sharing.

In some embodiments, among the plurality of consecutive image frames (Frame_1 to Frame_n), a duration of a first display stage (Display 1) of a first image frame (Frame_1) is defined as T11, a duration of a first display stage (Display 1) of a second image frame (Frame_2) is defined as T21, . . . , and a duration of a first display stage (Display 1) of a nth image frame (Frame_n) is defined as Tn1, in which T11, T21, . . . , and Tn1 satisfy the following relationship: T11≠T21≠ . . . ≠Tn1. Moreover, for each of the plurality of consecutive image frames (Frame_1 to Frame_n), a duration of a second display stage (Display 2), a duration of a third display stage (Display 3), . . . , and a duration of a Mth display stage (Display M) are equal, and a duration of a first touch stage (Touch 1), a duration of a second touch stage (Touch 2), . . . , and a duration of a Nth touch stage (Touch N) are equal.

In the above embodiments, positions of the horizontal stripes of any adjacent two image frames are different, so that the identifiability of the human eye to the horizontal stripes can be greatly reduced by utilizing the exchange of time and space, thereby improving the display effect of the touch panel.

In some embodiments, timing sequences of any adjacent two image frames can be determined according to a preset adjustment value ΔT, in which the preset adjustment value ΔT is a negative value, and T11, T21, . . . , Tn1, and ΔT satisfy the following equations: T21=T11+ΔT, T31=T21+ΔT, . . . , and Tn1=T(n−1)1+ΔT. When T21, T31, . . . , and Tn1 are in the preset duration range, the driving timing sequence of the plurality of consecutive image frames is shown in FIG. 6.

For example, a duration of a first display stage (Display 1) of a (k−1)th image frame (Frame_k−1) is defined as T(k−1), a duration of a first display stage (Display 1) of a kth image frame (Frame_k) is defined as Tk1, T(k−1), Tk1, and ΔT satisfy the following equation: Tk1=T(k−1)1+ΔT, in which Tk1 is less than a minimum value in the preset duration range. Then setting Tk1=T(k−1)1−ΔT, T(k+1)1=Tk1−ΔT, T(k+2)1=T(k+1)1−ΔT, . . . , until a duration of a first display stage (Display 1) of one image frame is greater than a maximum value in the preset duration range, and then determining a sum of a duration of a first display stage (Display 1) of a previous image frame and the preset adjustment value ΔT as a duration of a first display stage (Display 1) of a current image frame, et cetera, until the display is completed.

In some embodiments, when the preset adjustment value ΔT is a positive value, determining the sum of the duration of the first display stage (Display 1) of the previous image frame and the preset adjustment value ΔT as the duration of the first display stage (Display 1) of the current image frame, determining the sum of the duration of the first display stage (Display 1) of the current image frame and the preset adjustment value ΔT as the duration of the first display stage (Display 1) of the next image frame, . . . , et cetera, until the duration of the first display stage (Display 1) of one image frame is greater than the maximum value in the preset duration range, and then determining an absolute value of a difference between the duration of the first display stage (Display 1) of the previous image frame and the preset adjustment value ΔT as the duration of the first display stage (Display 1) of the current image frame, et cetera, until the display is completed.

In the above embodiments, the switching positions between the display stages and the touch stages of different image frames can be changed regularly, simplifying the complexity of adjustment of timing sequences, and avoiding the switching positions being in the same position. Moreover, the identifiability of the human eye to the horizontal stripes can be reduced by utilizing the exchange of time and space, thereby improving the display effect of the touch panel.

In some embodiments, for a plurality of image frames, the timing sequences of any adjacent two image frames can be determined according to a random duration (a duration randomly generated). Specifically, a duration different from a duration of a first display stage (Display 1) of a first image frame is randomly generated in a preset duration range, and determined as a duration of a first display stage (Display 1) of a second image frame. Then, a duration different from the duration of the first display stage (Display 1) of the second image frame is randomly generated in the preset duration range, and determined as a duration of a first display stage (Display 1) of a third image frame, et cetera, until the display is completed.

As illustrated in FIG. 7, FIG. 7 is another schematic diagram of a driving timing sequence of a plurality of consecutive image frames provided in some embodiments of the disclosure. For a plurality of consecutive image frames (Frame_1 to Frame_K+T+P), the display process of each image frame includes a plurality of display stages and a plurality of touch stages, for example, a first display stage (Display 1), a first touch stage (Touch 1), a second display stage (Display 2), a second touch stage (Touch 2), . . . , a Nth touch stage (Touch N), and a Mth display stage (Display M) alternatively performed in time-sharing.

In some embodiments, among the plurality of consecutive image frames (Frame_1 to Frame_K+T+P), a duration of a first display stage (Display 1) of a first image frame (Frame_1) is defined as T11, a duration of a first display stage (Display 1) of a second image frame (Frame_2) is defined as T21, . . . , and a duration of a first display stage (Display 1) of a Kth image frame (Frame_K) is defined as TK1, in which T11, T21, . . . , and TK1 satisfy the following equation: T11=T21= . . . =TK1. Furthermore, a duration of a first display stage (Display 1) of a (K+1)th image frame (Frame_K+1) is defined as T(K+1)1, . . . , a duration of a first display stage (Display 1) of a (K+T)th image frame (Frame_K+T) is defined as T(K+T)1, T(K+1)1, T(K+2)1, . . . , and T(K+T)1 satisfy the following equation: T(K+1)1=T(K+2)1= . . . =T(K+T)1. Furthermore, a duration of a first display stage (Display 1) of a (K+T+1)th image frame (Frame_K+T+1) is defined as T(K+T+1)1, . . . , and a duration of a first display stage (Display 1) of a (K+T+P)th image frame (Frame_K+T+P) is defined as T(K+T+P)1, T(K+T+1)1, T(K+T+2)1, . . . , and T(K+T+P)1 satisfy the following equation: T(K+T+1)1−T(K+T+2)1= . . . =T(K+T+P)1, in which T(K+T+1)1/T(K+1)1/T11. Moreover, for each of the plurality of consecutive image frames (Frame_1 to Frame_K+T+P), a duration of a second display stage (Display 2), a duration of a third display stage (Display 3), . . . , and a duration of a Mth display stage (Display M) are equal, and a duration of a first touch stage (Touch 1), a duration of a second touch stage (Touch 2), . . . , and a duration of a Nth touch stage (Touch N) are equal.

In some embodiments, the duration T(K+1)1 of the first display stage (Display) 1 of the (K+1)th image frame (Frame_K+1) can be generated randomly; alternatively, the duration T(K+1)1 of the first display stage (Display) 1 of the (K+1)th image frame (Frame_K+1) can be generated according to a preset adjustment value and the duration TK1 of the first display stage (Display) 1 of the Kth image frame (Frame_K). The duration T(K+T+1)1 of the first display stage (Display 1) of the (K+T+1)th image frame (Frame_K+T+1) can be generated randomly; alternatively, the duration T(K+T+1)1 of the first display stage (Display 1) of the (K+T+1)th image frame (Frame_K+T+1) can be generated according to a preset adjustment value and the duration T(K+T)1 of the first display stage (Display 1) of the (K+T)th image frame (Frame_K+T). That is, both of the duration T(K+T+1)1 and the duration T(K+1)1 can be generated randomly or be generated according to a preset adjustment value; alternatively, one of the duration T(K+T+1)1 and the duration T(K+1)1 can be generated randomly, and another of the duration T(K+T+1)1 and the duration T(K+1)1 can be generated according to a preset adjustment value. The embodiments of the disclosure do not limit on this. When both of the duration T(K+T+1)1 and the duration T(K+1)1 are generated according to a preset adjustment value, the preset adjustment value can adapt different variation values, which is not limited herein, as long as the switching positions between the display stages and the touch stages in the display process of different image frames in the video stream are not always maintained at the same position, it should belong to the inventive concept of the disclosure and should be included in the scope of protection of the disclosure.

In the above embodiments, the switching positions between the display stages and the touch stages of different image frames can be changed flexibly, so as to avoid the switching positions always being at the same position, reduce the identifiability of the human eye to the horizontal stripes by utilizing the exchange of time and space, and improve the display effect of the touch panel.

It can be understood that the driving method provided in the embodiments of the disclosure can change the switching positions between the display stages and the touch stages of different image frames, so as to disrupt the occurrence position of the horizontal stripes by utilizing the exchange of time and space, reduce the identifiability of the human eye to the horizontal stripes, and improve the user experience for the touch panel.

Figure 8:
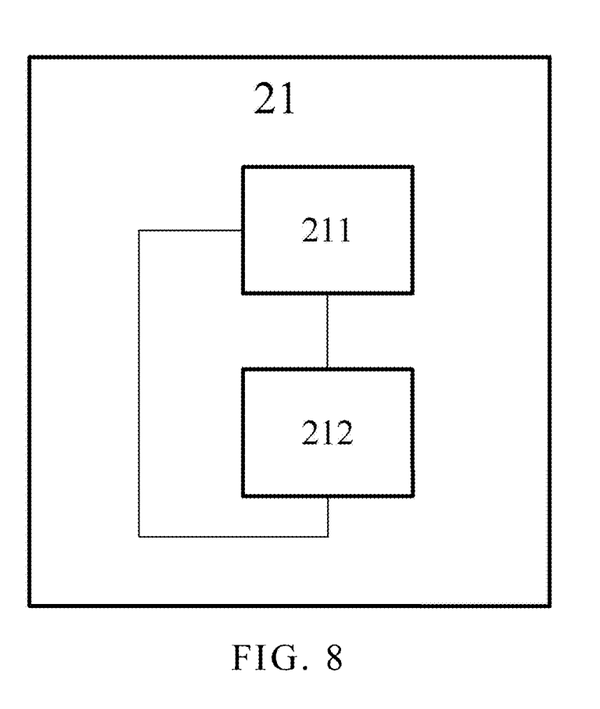
FIG. 8 is a schematic structural diagram of a driving device for a touch panel provided in some embodiments of the disclosure.

As illustrated in FIG. 8, FIG. 8 is a schematic structural diagram of a driving device for a touch panel provided in some embodiments of the disclosure. A driving device 21 for the touch panel includes a control module 211 and a processing module 212.

The control module 211 is configured to control the touch panel to scan and display at least one first image frame according to a first timing sequence. The first timing sequence includes a plurality of first display stages and a plurality of first touch stages alternately performed in time-sharing. The touch panel is configured to scan and display the first image frame in the first display stages and load touch signals in the first touch stages. A first switching position is defined between each of the first display stages and each of the first touch stages.

The processing module 212 is configured to determine a second timing sequence according to the first timing sequence. The second timing sequence includes a plurality of second display stages and a plurality of second touch stages alternately performed in time-sharing. A second switching position is defined between each of the second display stages and each of the second touch stages, and the second switching position is different from the first switching position.

The control module 211 is further configured to control the touch panel to scan and display at least one second image frame according to the second timing sequence. The second image frame is located after the first image frame. The touch panel is further configured to scan and display the second image frame in the second display stages and load touch signals in the second touch stages.

In some embodiments, a first one of the first display stages in the first timing sequence has a first duration, each of the first touch stages has a third duration, and one of the first display stages between any adjacent two of the first touch stages has a fourth duration. A first one of the second display stages in the second timing sequence has a second duration, each of the second touch stages has a fifth duration, and one of the second display stages between any adjacent two of the second touch stages has a sixth duration. The second duration is not equal to the first duration, the third duration is equal to the fifth duration are equal, and the fourth duration is equal to the sixth duration.

In some embodiments, the processing module 212 is configured to determine the second duration according to the first timing sequence, in which the step of determining the second duration includes the following steps:
   generating a random duration in a preset duration range;
   determining the random duration as the second duration in response to the random duration being not equal to the first duration; or
   regenerating the random duration in the preset duration range in response to the random duration being equal to the first duration.

In some embodiments, the processing module 212 is configured to determine the second duration, in which the step of determining the second duration includes the following step:

determining the second duration according to a preset adjustment value and the first duration.

In some embodiments, the processing module 212 is configured to determine the second duration according to a preset adjustment value and the first duration, in which the step of determining the second duration according to a preset adjustment value and the first duration includes the following steps:

determining a sum of the first duration and the preset adjustment value as the second duration in response to the sum of the first duration and the preset adjustment value being in a preset duration range; or determining an absolute value of a difference between the first duration and the preset adjustment value as the second duration in response to the sum of the first duration and the preset adjustment value exceeding the preset duration range.

In some embodiments, the processing module 212 is configured to determine the second timing sequence according to the first timing sequence, in which the step of determining the second timing sequence according to the first timing sequence includes the following steps:

determining a starting position and an end position of a first one of the second display stages according to a starting position of the first one of the first display stages and the second duration; and determining a starting position and an end position of each of remaining ones of the second display stages, and determining a starting position and an end position of each of the second touch stages, according to the end position of the first one of the second display stages, the fifth duration, the sixth duration, and a total duration of data scanning of each image frame.

In some embodiments, the at least one first image frame includes consecutive K first image frames, the at least one second image frame includes consecutive T second image frames, and the timing sequence of the first one of the consecutive T second image frames is adjacent to the timing sequence of the last one of the consecutive K first image frames, in which K and T are both positive integers.

In some embodiments, the processing module 212 is further configured to determine a third timing sequence according to the second timing sequence. The third timing sequence includes a plurality of third display stages and a plurality of third touch stages alternately performed in time-sharing. A third switching position is defined between each of the third display stages and each of the third touch stages, and the third switching position is different from the second switching position.

In some embodiments, the control module 211 is further configured to control the touch panel to scan and display at least one third image frame according to the third timing sequence. The third image frame is located after consecutive T second image frames and adjacent to a last one of the consecutive T second image frames. The touch panel is further configured to scan and display the third image frame in the third display stages and load touch signals in the third touch stages.

It can be understood that in the driving device 21 provided in the embodiments of the disclosure, the switching positions between the display stages and the touch stages of any image frame of different image frames are different. Therefore, by utilizing the exchange of time and space to disrupt the occurrence position of horizontal stripes, the embodiments of the disclosure can reduce the identifiability of the human eye to the horizontal stripes, so as to improve the user experience for the touch panel.

Correspondingly, the display device provided in the embodiments of the disclosure can reduce the identifiability of the human eye to the horizontal stripes, making it difficult for users to recognize the horizontal stripes when switching between the display stages and the touch stages, thereby providing a better user experience.

The above provides a detailed introduction to the driving method for the touch panel, the driving device for the touch panel, and the display device provided in the embodiments of the disclosure. Specific embodiments are applied in this context to explain the principles and implementation methods of the disclosure. The description of the above-mentioned embodiments is only used to help understand the technical solutions and core ideas of the disclosure. One ordinary person skill in the art should understand that they can still modify the technical solutions described in the aforementioned embodiments, or equivalently replace some of the technical features; and these modifications or replacements do not deviate from the essence of the corresponding technical solutions from the scope of the technical solutions in various embodiments of the disclosure. Therefore, the contents of the disclosure should not be understood as limitations on the disclosure.

What is claimed is:

1. A driving method for a touch panel comprising:

controlling the touch panel to scan and display at least one first image frame according to a first timing sequence, wherein the first timing sequence comprises a plurality of first display stages and a plurality of first touch stages alternately performed in time-sharing, the touch panel is configured to scan and display the first image frame in the first display stages and load touch signals in the first touch stages, and a first switching position is defined between each of the first display stages and each of the first touch stages;

determining a second timing sequence according to the first timing sequence, wherein the second timing sequence comprises a plurality of second display stages and a plurality of second touch stages alternately performed in time-sharing, a second switching position is defined between each of the second display stages and each of the second touch stages, and the second switching position is different from the first switching position; and controlling the touch panel to scan and display at least one second image frame according to the second timing sequence, wherein the second image frame is located after the first image frame, and the touch panel is further configured to scan and display the second image frame in the second display stages and load touch signals in the second touch stages, wherein a first one of the first display stages in the first timing sequence has a first duration, and a first one of the second display stages in the second timing sequence has a second duration; each of the first touch stages has a third duration, and one of the first display stages between any adjacent two of the first touch stages has a fourth duration; and each of the second touch stages has a fifth duration, and one of the second display stages between any adjacent two of the second touch stages has a sixth duration; and wherein the second duration is not equal to the first duration, the third duration is equal to the fifth duration, and the fourth duration is equal to the sixth duration.

2. The driving method for the touch panel of claim 1, wherein a step of determining the second duration comprises:

generating a random duration in a preset duration range;

determining the random duration as the second duration in response to the random duration being not equal to the first duration; or regenerating the random duration in the preset duration range in response to the random duration being equal to the first duration.

3. The driving method for the touch panel of claim 1, wherein a step of determining the second duration comprises:

determining the second duration according to a preset adjustment value and the first duration.

4. The driving method for the touch panel of claim 3, wherein the step of determining the second duration according to a preset adjustment value and the first duration comprises:

determining a sum of the first duration and the preset adjustment value as the second duration in response to the sum of the first duration and the preset adjustment value being in a preset duration range; or determining an absolute value of a difference between the first duration and the preset adjustment value as the second duration in response to the sum of the first duration and the preset adjustment value exceeding the preset duration range.

5. The driving method for the touch panel of claim 2, wherein the step of determining a second timing sequence according to the first timing sequence comprises:

determining a starting position and an end position of the first one of the second display stages according to a starting position of the first one of the first display stages and the second duration; and determining a starting position and an end position of each of remaining ones of the second display stages, and determining a starting position and an end position of each of the second touch stages, according to the end position of the first one of the second display stages, the fifth duration, the sixth duration, and a total duration of data scanning of each image frame.

6. The driving method for the touch panel of claim 3, wherein the step of determining a second timing sequence according to the first timing sequence comprises:

determining a starting position and an end position of the first one of the second display stages according to a starting position of the first one of the first display stages and the second duration; and determining a starting position and an end position of each of remaining ones of the second display stages, and determining a starting position and an end position of each of the second touch stages, according to the end position of the first one of the second display stages, the fifth duration, the sixth duration, and a total duration of data scanning of each image frame.

7. The driving method for the touch panel of claim 1, wherein the at least one first image frame comprises consecutive K first image frames, the at least one second image frame comprises consecutive T second image frames, and a timing sequence of a first one of the consecutive T second image frames is adjacent to a timing sequence of a last one of the consecutive K first image frames, wherein K and T are both positive integers.

8. The driving method for the touch panel of claim 7, further comprising:

determining a third timing sequence according to the second timing sequence, wherein the third timing sequence comprises a plurality of third display stages and a plurality of third touch stages alternately performed in time-sharing, a third switching position is defined between each of the third display stages and each of the third touch stages, and the third switching position is different from the second switching position; and controlling the touch panel to scan and display at least one third image frame according to the third timing sequence, wherein the third image frame is located after the consecutive T second image frames and adjacent to a last one of the consecutive T second image frames; and the touch panel is further configured to scan and display the third image frame in the third display stages and load touch signals in the third touch stages.

9. A driving device for a touch panel, wherein the driving device adapts the driving method for the touch panel as claimed in claim 1.

10. A display device comprising a timing controller configured to perform the driving method for the touch panel as claimed in claim 1, wherein the display panel comprises the touch panel whose display and touch functionalities are controlled by the timing controller when performing the driving method.

11. A display device comprising a touch panel and a timing controller, wherein the timing controller comprises the driving device for the touch panel as claimed in claim 9.

* * * * *